United States Patent [19]
Johnson et al.

[11] 3,811,385
[45] May 21, 1974

[54] TRANSPORTATION SYSTEM

[75] Inventors: Ernest D. Johnson, Tallmadge;
Gerald D. Kirschner, Akron;
Edward Kondrajian, Akron; Gerald
L. Woodling, Akron, all of Ohio

[73] Assignee: The Goodyear Tire & Rubber
Company, Akron, Ohio

[22] Filed: Mar. 29, 1973

[21] Appl. No.: 345,999

[52] U.S. Cl.................................. 104/167, 104/25
[51] Int. Cl............................................ B61b 13/00
[58] Field of Search......... 104/86, 87, 166, 167, 18,
104/20, 25, 147 R, 147 A, 190, 162, 163;
198/16 MS, 110

[56] References Cited
UNITED STATES PATENTS

| | | | |
|---|---|---|---|
| 2,752,883 | 7/1956 | Curtis | 104/167 X |
| 3,136,266 | 6/1964 | Seidman | 104/18 |
| 3,238,893 | 3/1966 | Zuppiger | 104/25 |
| 3,541,962 | 11/1970 | Avery | 104/20 X |

FOREIGN PATENTS OR APPLICATIONS

| | | | |
|---|---|---|---|
| 1,177,237 | 1/1970 | Great Britain | 104/166 |

*Primary Examiner*—Lloyd L. King
*Assistant Examiner*—Andres Kashnikow
*Attorney, Agent, or Firm*—F. W. Brunner; R. P. Yaist;
Frederick K. Lacher

[57] ABSTRACT

A vehicle drive system in which the vehicle is driven by a moving cable in a high speed portion of the system and by a rotating screw in a variable speed portion of the system. A spread groove configuration of the screw cooperating with a rotatable follower wheel supported by a spring-loaded arm pivotally mounted on the vehicle provides a smooth drive transition at the interface between the cable drive and the screw drive. A guide rail with a variable contour extending along the pathway of the system is engaged by fore and aft guide rollers on the vehicle for maintaining the position of the vehicle on the pathway and, in addition, actuating a cable clamping and releasing apparatus on the vehicle in the transition portion of the system. The guide rail also maintains the position of the vehicle at the turnaround where adjacent vehicles are connected at the radially inner corners of the vehicle.

22 Claims, 7 Drawing Figures

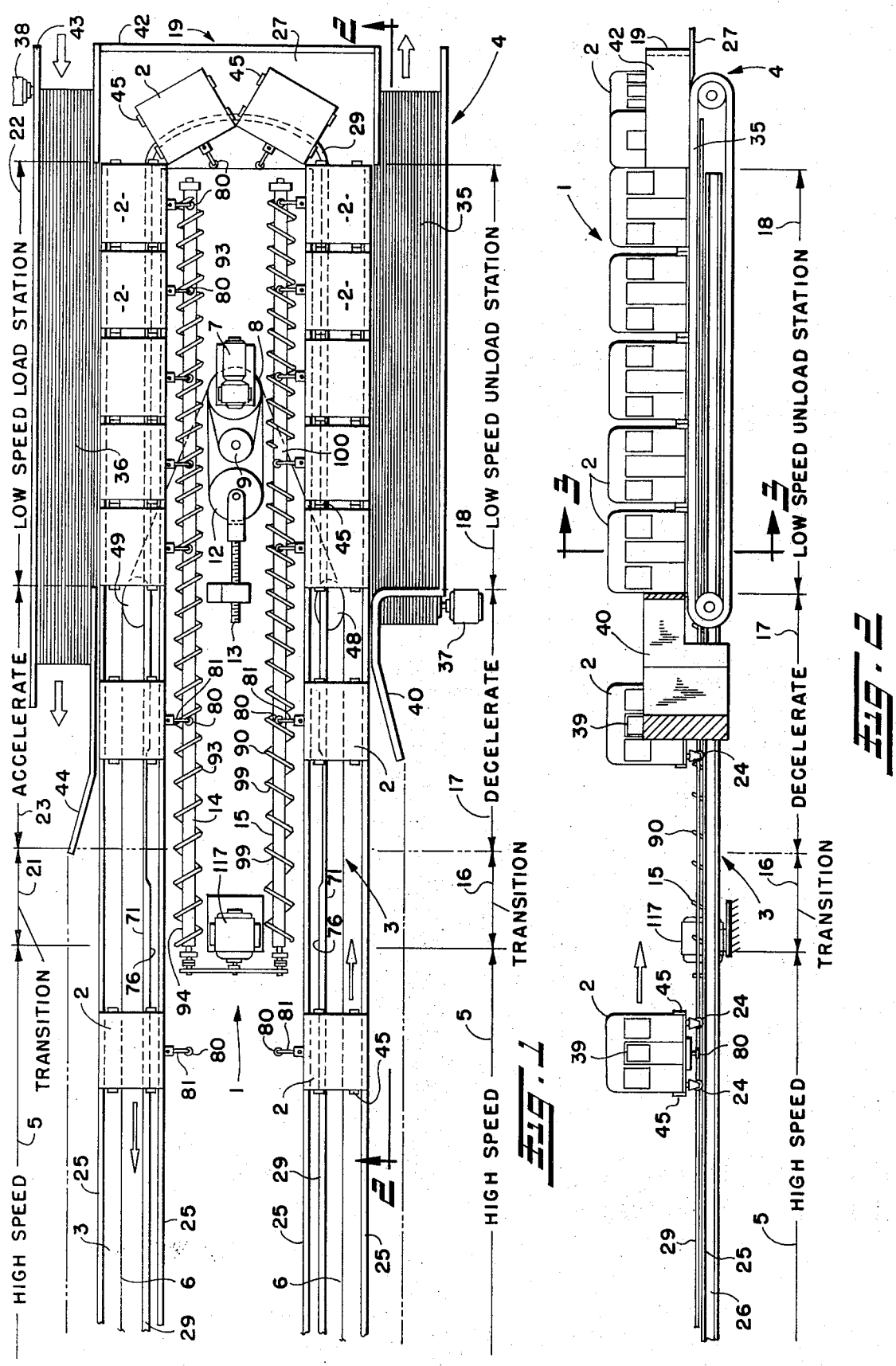

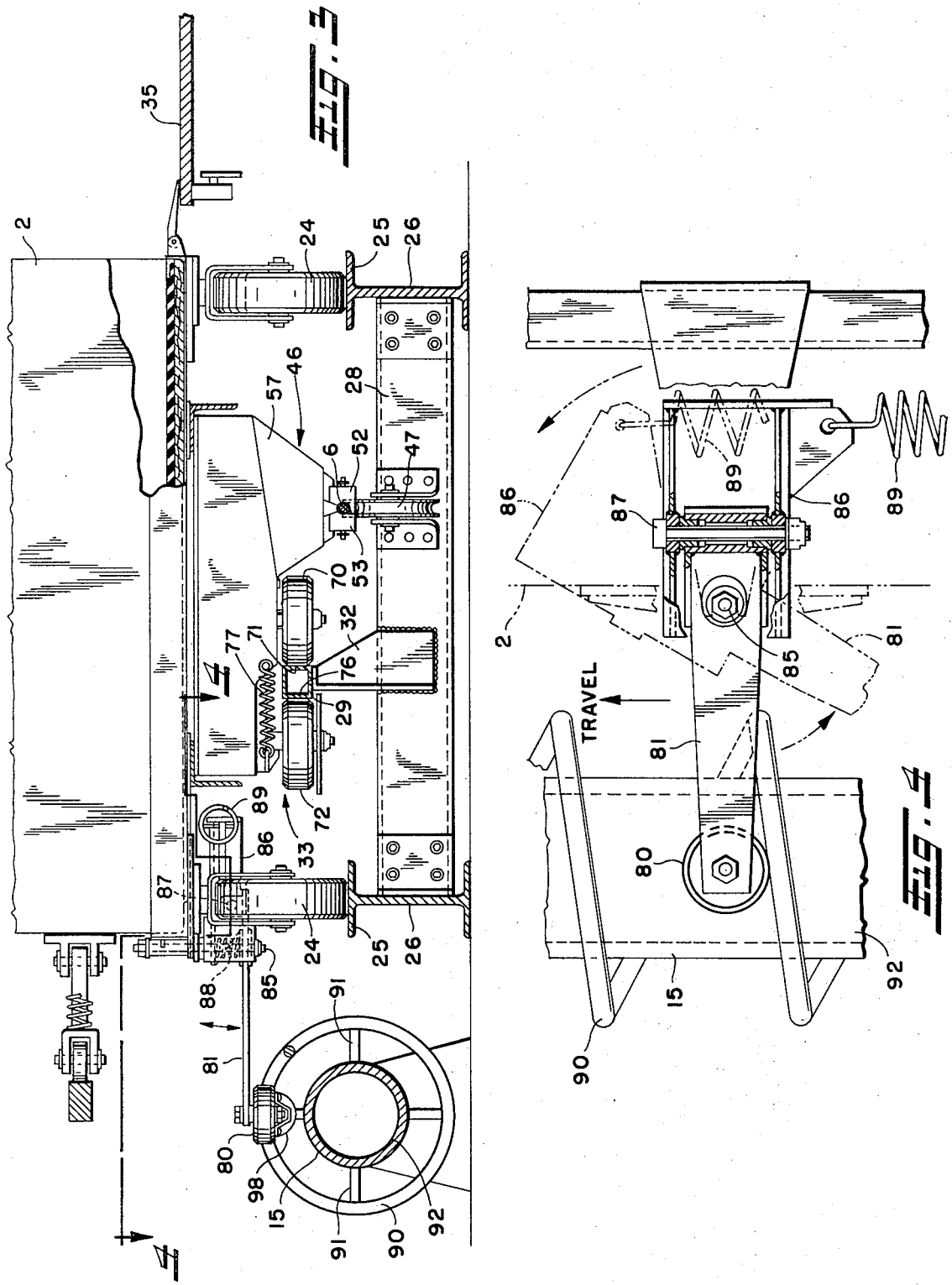

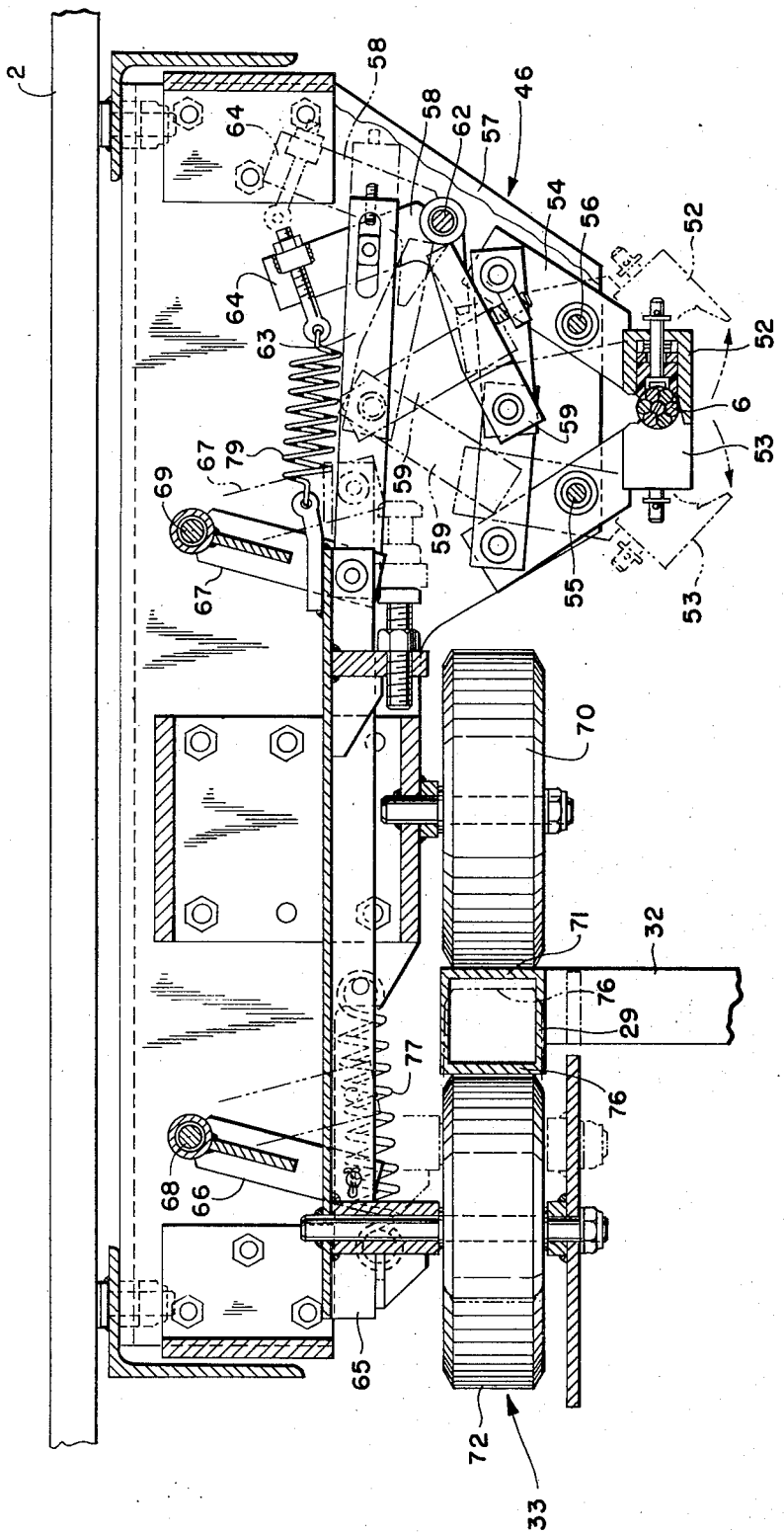

TRANSPORTATION SYSTEM

This invention relates generally, as indicated, to the drive system of a multiple vehicle conveyor for passengers or articles where the vehicles are driven by an endless member such as a cable in the high speed section and by rotating screws in the acceleration and deceleration sections of the system. The vehicle has a clamping mechanism for gripping the cable in the high speed section and a follower wheel for engaging the helical rib of the screws in the acceleration and deceleration sections.

Heretofore, transportation systems have been proposed in which vehicles have been driven by screws and cables; however, these designs require nearly exact synchronization between the cable and screw drives so that the follower wheel of the vehicle will exactly mesh with the helical drive rib of the screw at the interface between the screw and cable. In a commercial passenger or article conveying system, it is difficult and costly to provide the exact synchronization of the cable and srew drives because of the variable conditions such as different loading of vehicles, wind loading, temperature differentials and slippage of the clamp on the cable. There is also a problem in an automatic system of releasing the cable at the proper time and positioning of the vehicles in the system.

Another problem has been the driving of the vehicles at the turnaround where a spoked turntable has been used necessitating synchronization between the spoked wheel drive and the screw drives.

With the foregoing in mind, it is the principal object of this invention to provide a relatively simple and maintenance free vehicle drive system for the transition from cable drive to screw drive.

Another object of the invention is to provide a screw having a helical rib and a groove between the flights of the helical rib for receiving the driven follower wheel of the vehicle.

A further object of the invention is to provide for supporting the driven follower wheel of the vehicle on an arm which is resiliently mounted for engagement of the follower wheel with the outer edge of the rib prior to entering the groove and engaging the driving edge of the rib.

A still further object of the invention is to provide apparatus for clamping and releasing the cable at the transition portions of the system.

Another object of the invention is to provide a guide rail for maintaining the vehicle on the pathway of the system and actuating the cable clamping apparatus.

A further object of the invention is to provide a screw drive for the vehicle in the low speed portion of the system with the screws located in such a position as to permit disposition of moving platforms alongside the vehicle for boarding and leaving the vehicles.

Another object of the invention is to provide for guide wheels mounted on the vehicle at spaced apart positions for engagement with the guide rail and to provide supporting wheels which will accommodate turning movement of the vehicle.

Still another object of the invention is to provide synchronized driving of the screws at different stations for control of the distribution of the vehicles in the system.

These and other objects of the invention are provided by the spread groove configuration of the screw cooperating with the rotatable follower wheel supported on a spring-loaded arm pivotally mounted on the vehicle. The clamping mechanism in combination with actuating guide rollers responsive to variations in the contour of the guide rail provide for clamping and releasing the cable at the desired sections of the system.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawings:

FIG. 1 is a schematic plan view of a portion of a passenger conveyor system incorporating the preferred form of the invention showing a typical station.

FIG. 2 is a side elevation taken along the plane of line 2—2 of FIG. 1.

FIG. 3 is an enlarged sectional view taken along the plane of line 3—3 of FIG. 2.

FIG. 4 is a fragmentary sectional view taken along the planes of line 4—4 of FIG. 3.

FIG. 5 is an enlarged detailed sectional view like FIG. 3 showing the clamping mechanism linkage with parts being broken away.

Figure 6:
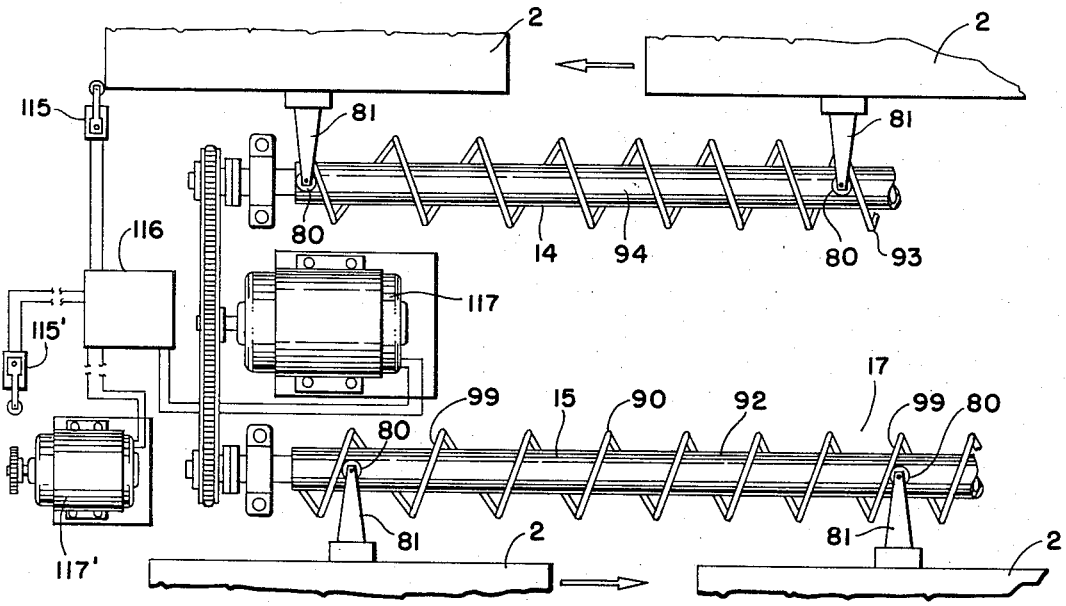
FIG. 6 is an enlarged fragmentary plan view like FIG. 1 showing the screw drive mechanism and control means.

Referring to FIGS. 1 and 2 there is schematically shown a vehicle drive system 1 for conveying passengers and in which vehicles 2 are driven along a pathway 3 extending between and through stations such as station 4 shown in FIGS. 1 and 2. The vehicles 2 are driven at a relatively high speed of approximately fifteen miles per hour in the constant speed section 5 by an endless drive member such as steel cable 6. A drive motor 7 turns a driving pulley 8 about which the cable 6 is disposed and idler pulleys 9 and 12 are located adjacent the driving pulley to direct the movement of the cable with the idler pulley 12 being mounted on a screw adjustment 13 for regulating the tension of the cable.

In the station 4 the vehicles 2 are driven by rotatable screw members such as screws 14 and 15 extending alongside the pathway 3 and between the sections of the pathway leading into and out of the station 4. The drive of the vehicles 2 is transferred from the cable 6 to the screw 15 in the incoming transition section 16 after which the vehicles are decelerated in the incoming variable speed section 17 to a low speed of approximately 1.5 miles per hour at the low speed section or unload station 18. The vehicles 2 are then carried through a turnaround section 19 to another low speed section or load station 22 after which the vehicles are accelerated in an outgoing variable speed section 23 to a speed equal to the speed of the cable 6 and moved into an outgoing transition section 21 where the drive is transferred from the screw 14 to the cable 6.

Figure 7:
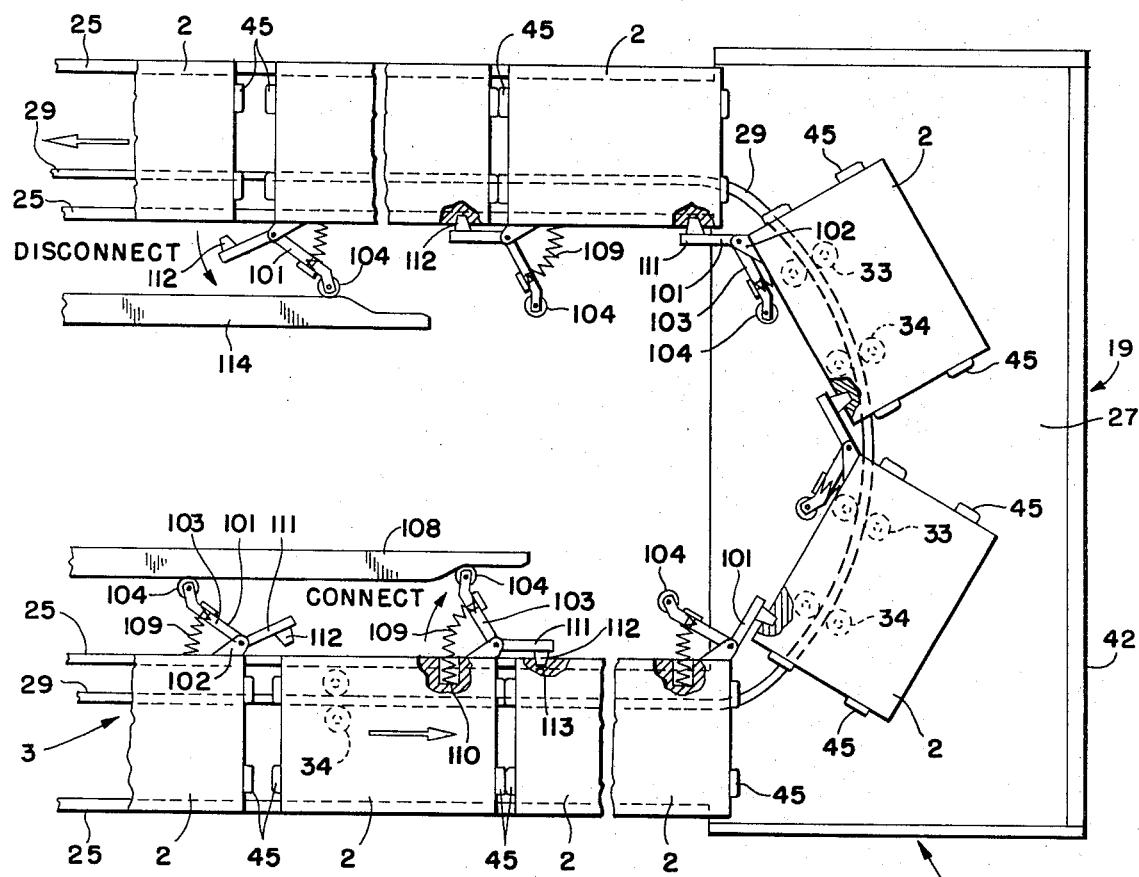
FIG. 7 is an enlarged plan view like FIG. 1 showing the connecting mechanism at the turnaround section, parts being broken away.

As shown more clearly in FIG. 3 the vehicles 2 have supporting wheels 24 for rolling engagement with flanges 25 of beams 26 forming a track on which the vehicles roll. At the turnaround section 19 the wheels 24 are supported on a platform 27 as shown in FIGS. 1, 2 and 7. The beams 26 are held in position by transverse supporting members such as channels 28.

Guide rail 29 extends along the pathway 3 and may be supported by brackets 32 on channel 28 or by the platform 27 in the turnaround section 19 as shown in FIGS. 3, 5 and 7. Each of the vehicles 2 has a forward pair of guide rollers 33 and a rearward pair of guide rollers 34 straddling the guide rail 29 and mounted on the underside of the vehicles 2 for maintaining the position of the vehciles along the pathway 3 and through the turnaround section 19.

At the unload station 18 and the load station 22 moving platforms such as belts 35 and 36 respectively are located alongside the vehicles 2 and are driven at the same speed as the vehicles by drive motors 37 and 38 respectively. The vehicles 2 have doors 39 which are automatically opened in the unload station 18 and load station 22 and closed otherwise so that passengers cannot leave the vehicles except at the stations where they can step out onto the belt 35 and enter from the belt 36. Protective balustrades 40, 42, 43 and 44 are provided to retain the passengers on the belts 35 and 36 and separated from the pathway 3 where the vehicles 2 are not in abutting relationship as shown in FIGS. 1 and 2. Bumpers 45 of a yieldable material such as rubber are provided at the ends of the vehicles for engagement in the station 4. In the constant speed section 5 of the vehicle drive system 1 the vehicles 2 are driven by the cable 6 and each of the vehicles has a cable clamping apparatus 46 mounted on the underside of the vehicle 2 as shown in FIGS. 3 and 5. The cable 6 is supported above the channels 28 by pulleys 47 mounted on channels 28 along the pathway 3 and carried to and from the driving pulley 8 by idler pulleys 48 and 49 as shown in FIG. 1. In the incoming transition section 16 of the drive system 1 the clamping apparatus 46 is actuated to release the cable 6 after the screw 15 is in driving engagement with the vehicle 2. As shown in FIG. 5 the cable clamping apparatus has a pair of clamping shoes 52 and 53 mounted on a toggle linkage 54 pivoted on pins 55 and 56 which are mounted in a supporting structure 57 securely fastened to the underside of the vehicle 2. A bell crank 58 having one arm 59 connected to the toggle linkage 54 and rotatable about a pivot pin 62 mounted in the supporting structure 57 is connected to a connecting rod 63 engaging the other arm 64 of the bell crank. The connecting rod 63 is pivotally connected to a swinging beam 65 supported by parallel arms 66 and 67 each of which has one end pivotally connected to the swinging beam and the other end pivotally connected to pins 68 and 69 mounted in the supporting structure 57 on the underside of the vehicle 2.

As shown in FIG. 5 the forward pair of guide rollers 33 has a fixed guide roller 70 rotatably mounted in the supporting structure 57 for rotation about a vertical axis and for engagement of the surface of the guide roller with a guide face 71 of the guide rail 29. A movable guide roller 72 is rotatably mounted for rotation about a vertical axis on the swinging beam 65 and for rolling engagement with a cam face 76 of the guide rail 29. As shown in FIG. 1 and in chain dotted lines in FIG. 5 the cam face 76 of the guide rail 29 is displaced from a position shown in full lines to the position shown in chain dotted lines in FIG. 5 in the incoming transition section 16 causing the swinging beam 65 to move to the right as shown in FIG. 5 because of the force exerted by a clamping spring 77. The connecting rod 63 is also moved to the right turning the bell crank 58 in a clockwise direction actuating the toggle linkage 54 and spreading the shoes 52 and 53 to release the clamping pressure on cable 6 as shown in chain dotted lines in FIG. 5.

It will be noted that in the outgoing transition section 21 the cam face 76 of the guide rail 29 changes from the position shown in chain dotted lines in FIG. 5 to the position shown in full lines and a swinging beam 65 is moved to the left causing the toggle linkage 54 to assume the position shown in solid lines. By means of a holding spring 79 connected in tension between the swinging beam 65 and the arm 64 of the bell crank 58 the toggle linkage is held in an off center clamping position as shown in solid lines in FIG. 5. In this way the cable 6 is clamped upon diverging movement of the guide rollers 33 and released upon converging movement of the guide rollers caused by the changing contour of the guide rail 29.

The rearward pair of guide rollers 34 have a similar construction to the forward pair of guide rollers 33 but are not connected to a cable clamping apparatus 46 in the embodiment shown in the drawings and described herein.

Each of the vehicles 2 has a follower wheel 80 for engagement with the screws 14 and 15. The follower wheel 80 is rotatably mounted about a generally vertical axis on an arm 81 pivotally mounted on a vertically extending rod 85 which supports a bracket 86 having a pivot pin 87 extending in a generally horizontal position axial of the screw 15 to permit vertical movement of the follower as shown in FIG. 3 and also counterclockwise horizontal movement as shown in FIG. 4. Compression spring 88 located around the vertically extending rod 85 and over the arm 81 urges the follower wheel 80 downward towards the screw 15 while permitting upward movement in the event of interfering engagement with the screw. Tension spring 89 connecting the end of the bracket 86 and the frame of the vehicle 2 urges the arm 81 in the clockwise direction as shown in FIG. 4 but does permit movement of the arm in a counterclockwise direction to the position shown in the chain dotted lines in FIG. 4. The arm 81 cannot move about the rod 85 in a clockwise direction as shown in FIG. 4 and therefore provides the driving connection which is necessary for movement of the vehicle 2.

As shown in FIGS. 3 and 6 the screw 15 has a helical rib 90 supported on spokes 91 connected to a central shaft 92. Likewise the screw 14 has a helical rib 93 supported on spokes (not shown) mounted on a shaft 94. As shown in FIG. 3 the follower wheel 80 has a downwardly extending protruding hubcap 98 presenting a smooth round surface for engagement with the rib 90 of screw 15 in the incoming transition section 16 where it is possible that the follower wheel will not be in position to engage the screw 15 without interference with the rib 90. The hubcap 98 permits the follower wheel 80 to engage the rib at the outer circumference without injury to the rib 90 or the wheel. The compression springs 88 permits vertical movement of the follower wheel 80 to further minimize any danger of damage to the mechanism.

At the end of the screw 15 adjacent the incoming transition section 16 helical groove 99 between the flights of the rib 90 is spread to a width which is proportional to the velocity of the car providing an increased space for receiving the wheel 80.

At the unload station 18 the helical rib 93 is discontinued in an accumulator section 100 where the vehicles 2 are propelled by engagement of the bumpers 45 providing the continuous chain of abutting vehicles which is desirable in the station area. When the vehicles 2 pass the accumulator section 100 the follower wheel 80 is again engaged by the rib 93 and the vehicles are driven toward the turnaround section 19.

In the event that two of the vehicles 2 are closely spaced due to slippage of the clamping mechanism on the cable 6 or some other operational difficulty the following vehicle may be forced into abutting relationship with the forward vehicle in the incoming variable speed section 17. Provision is made for this condition by the resilient swinging action in the counterclockwise direction of the arm 81 as shown in FIG. 4 in chain dotted lines and the resilient vertical swinging action of the arm in the clockwise direction of the arm as shown in FIG. 3 whereby the follower wheel 80 may be forced forward in the direction of travel as shown in FIG. 4 and over the rib 90 without damage to any of the mechanism.

Before the vehicles 2 move out of the unload station 18 into the turnaround section 19 they are connected at one corner in driving relationship for movement through the turnaround section. As shown in FIG. 7 a bell crank connecting member 101 is pivotally mounted on a bracket 102 on a corner of the vehicle and has an actuating arm 103 carrying a cam follower 104 for engagement with a cam bar 108 extending along the side of the pathway 3 opposite the belt 35. A compression spring 109 mounted in a recess 110 resiliently urges the bell crank 101 in a clockwise direction as shown in FIG. 7. A connecting arm 111 of the bell crank 101 has a lug 112 for driving engagement with a hole 113 in a second connecting member such as the wall of the adjacent vehicle 2. As the vehicles 2 come together the cam bar 108 engages the follower 104 rotating the bell crank 101 in the counterclockwise direction as shown in FIG. 7 providing for clearance of the lug 112 with the edge of the adjacent vehicle 2. After the bumpers 45 on the vehicles are engaged the cam surface of the cam bar 108 permits movement of the bell crank 101 in the clockwise direction and the lug 112 enters the hole 113 connecting the two vehicles. Then as the vehicles enter the turnaround section 19 the connecting arm 111 is kept in engagement with the adjacent vehicle and the vehicles are driven through the turnaround section 19 into the load station 22. The connecting arm 111 may be kept in engagement with the adjacent vehicle until the screw 14 starts to separate the vehicles 2 in the outgoing variable speed section 23. At this position shown in FIG. 7 an outer cam bar 114 engages the cam follower 104 causing the bell crank 101 to rotate in the counterclockwise direction and remove the lug 112 from the hole 113 providing clearance for the separation of the vehicles. As shown in FIG. 7 the vehicles 2 are guided through the turnaround section 19 by the guide wheels 33 and 34 on the vehicles which engage the guide rail 29. In this way the necessity for another drive means to take the vehicles 2 through the turnaround section 19 is eliminated.

As shown in FIG. 1 the vehicles 2 are driven through the load station 22 at a low speed by the engagement of the helical rib 93 with the follower wheel 80. In the outgoing variable speed section 23 the ribs 93 have an increasing helical pitch to accelerate the vehicles 2 to a speed approximately that of the cable 6 in the outgoing transition section 21.

Control of the movement of the vehicles 2 throughout the system 1 is accomplished by controlling the speed at which the vehicles are moved out of the outgoing transition section 21. This movement is determined by an indicator at a point beyond the outgoing transition section 21 such as limit switches 115, 115' at each of the stations of the system as shown in FIG. 6. The signal from the limit switches 115, 115' are transmitted to a suitable control apparatus 116 for controlling the speed of a drive motor 117 and the drive motor 117' at another station which can either increase or decrease the number of vehicles being moved out of the station 4 by the screws 14. The control apparatus 116 will increase the spped of the drive motors 117, 117' where the limit switches 115, 115' show that a number of vehicles 2 being moved out of one station is less than those moved out of the other station. In this way the number of vehicles 2 will be evenly distributed over the whole system and there will not be a concentration of vehicles in one station and none in another.

With this construction a passenger conveyor system 1 is provided which utilizes the economies of a cable drive between stations and a screw drive to decelerate and accelerate the vehicles in the stations and provides for a smooth transition between the drives at the interface. Driving of the vehicles 2 through the turnaround section 19 and guidance of the vehicles on the pathway 3 and through the turnaround section is provided with a simplified mechanism requiring a minimum of maintenance. While certain representative embodiments and details have been shown for the purpose of illustrating the invention it will be apparent to those skilled in the art that various changes and modifications may be made therin without departing from the spirit or scope of the invention.

We, therefore, particularly point out and claim as our invention:

1. A vehicle drive system comprising an endless drive member for driving engagement with a vehicle along a pathway in a constant speed section of the system, a rotatable screw member having a helical rib for driving engagement with said vehicle in a variable speed section of the system, a drive transition section at the interface between said constant speed section and said variable speed section of the system, power means for driving said endless drive member and said screw at speeds for propelling said vehicle at approximately the same speed in said transition section, a follower wheel mounted on said vehicle and engageable with said helical rib, a helical groove between the flights of said helical rib, said groove being enlarged in said transition section of the system whereby movement of said follower wheel into said groove is facilitated at said transition section for engagement with said rib.

2. A vehicle drive system according to claim 1 wherein said groove between the flights of said helical rib in said transition section has a width proportional to the velocity of the vehicle.

3. A vehicle drive system according to claim 2 wherein said helical rib has a width less than the diameter of said wheel and said wheel has a protruding hub cap for guiding the wheel into said helical groove between the flights of said helical rib.

4. A vehicle drive system according to claim 1 wherein said follower wheel is supported by an arm pivotally mounted on said vehicle for movement of said follower wheel radially into said helical groove and resilient means disposed between said vehicle and said arm for yieldably urging said arm toward said screw member whereby driving engagement of said follower wheel by said helical rib is obtained in said transition section.

5. A vehicle drive system according to claim 4 wherein said arm is pivotally mounted about a vertical axis on said vehicle for movement of said follower wheel axially of said screw.

6. A vehicle drive system according to claim 5 wherein said resilient means comprises a coil spring fastened to said vehicle and to one end of said arm and said follower wheel is rotatably mounted on the other end of said arm.

7. A vehicle drive system according to claim 1 wherein said endless drive member includes a cable disposed over idler pulleys and driven by a driving pulley, said vehicle having a cable clamping apparatus and actuating means connected to said clamping apparatus for releasing said cable in said transition section of the system.

8. A vehicle drive system according to claim 7 wherein said actuating means for said clamping apparatus includes a guide rail extending through said transition section, said guide rail having a change in contour in said transition section and means responsive to said change in contour for releasing said clamping apparatus from said cable.

9. A vehicle drive system according to claim 8 wherein said actuating means further includes clamping apparatus guide rollers mounted under said vehicle and rotatable about vertical axes for rolling engagement with opposite sides of said guide rail, one of said guide rollers being movable and connected by linkage to a cable clamp whereby said cable is clamped upon diverging movement of said guide rollers and said cable is released upon converging movement of said guide rollers.

10. A vehicle drive system according to claim 9 wherein said clamping apparatus guide rollers are mounted at one end of said vehicle and a second pair of guide rollers are mounted on the other end of said vehicle for guiding said vehicle along said pathway of the system.

11. A vehicle drive system according to claim 1 further comprising a guide rail extending along said pathway and said vehicle having guide rollers mounted at opposite ends of said vehicle for engagement with said guide rail to guide said vehicle along the pathway of the system.

12. A vehicle drive system according to claim 11 wherein said guide rail extends through said constant speed section, said transition section and said variable speed section for maintaining the position of said vehicle on said pathway.

13. A vehicle drive system according to claim 1 wherein the pitch of said helical rib is gradually decreased in said variable speed section from a pitch producing a high speed drive in said transition section to a pitch producing a lower speed drive of said vehicle.

14. A vehicle drive system according to claim 13 wherein said screw extends from said variable speed section into a low speed section of said system from said transition section, said helical rib having a uniform low speed pitch in said low speed section of said system.

15. A vehicle drive system according to claim 14 wherein a moving platform is disposed alongside said vehicle at said low speed section of the system for passengers boarding and leaving said vehicle.

16. A vehicle drive system according to claim 15 wherein said moving platform comprises a belt and a second power means connected to said belt for movement of said belt at the same speed as said vehicle is driven by said screw in said low speed section of the system.

17. A vehicle drive system according to claim 16 wherein said belt is disposed on one side of said vehicle and said screw member is disposed on the opposite side of said vehicle.

18. A vehicle drive system according to claim 1 further comprising a turnaround section of the system in which said vehicle is turned for movement in a different direction and connecting means at each radially inner corner of said vehicle for driving and driven connection with adjacent vehicles in said turnaround section.

19. A vehicle drive system comprising power means for driving a series of vehicles along a pathway, a turnaround section of said pathway in which said vehicles are turned for movement in a different direction, connecting means at the radially inner corners of said vehicle for connecting adjacent vehicles in driving relation in the turnaround section.

20. A vehicle drive system according to claim 19 wherein said connecting means includes a cam operated lever carrying a first connecting member mounted on one of said vehicles and a second connecting member on an adjacent one of said vehicles for engagement with said first connecting member.

21. A vehicle drive system according to claim 20 wherein said cam is loacted along said pathway for engagement with said cam operated lever to move said first connecting member into and out of engagement with said second connecting member at the ends of said turnaround section.

22. A vehicle drive system comprising two stations, endless drive members extending between said stations, a series of vehicles in driving engagement with said endless drive members for movement between said stations, station drive means at each of said stations for conveying said vehicles into position for engagement with said endless drive members upon leaving said stations and control means responsive to the movement of said vehicles for regulating said station drive means to synchronize the number of vehicles leaving each of said stations.

* * * * *